United States Patent
Downey

[11] 3,727,429
[45] Apr. 17, 1973

[54] SHAFT COUPLING
[75] Inventor: Holmes Downey, Bremen, Ind.
[73] Assignee: Reliance Electric Company, Mishawaka, Ind.
[22] Filed: June 10, 1971
[21] Appl. No.: 151,848

Related U.S. Application Data
[63] Continuation-in-part of Ser. No. 40,751, May 27, 1970, abandoned.

[52] U.S. Cl. ....................................64/11 R, 64/13
[51] Int. Cl. ...............................................F16d 3/58
[58] Field of Search....................................64/11, 13

[56] References Cited

UNITED STATES PATENTS

| | | |
|---|---|---|
| 3,233,427 | 2/1966 | Firth..........................................64/11 |
| 3,068,665 | 12/1962 | Firth..........................................64/11 |
| 2,901,896 | 9/1959 | Reich.........................................64/11 |
| 3,020,737 | 2/1962 | Firth..........................................64/11 |
| 3,283,535 | 11/1966 | Grundtner..................................64/11 |

*Primary Examiner*—Kenneth W. Sprague
*Attorney*—Hobbs & Green

[57] ABSTRACT

A shaft coupling in which two spaced flanges are mounted on shafts positioned in end to end relation and a torsional element of elastomeric material and of a generally V-shaped cross sectional configuration with axially extending margins is secured to said flanges. The flanges are provided with an annular peripheral surface tapered with an increasing diameter towards the inner side of the flange, and clamping rings secured to the flanges by a plurality of screws and having an axially extending annular portion clamping the margins of the torsional element onto the tapered surfaces.

14 Claims, 5 Drawing Figures

INVENTOR.
HOLMES A. DOWNEY
BY
Hobbs & Green
ATTORNEYS

INVENTOR.
HOLMES A. DOWNEY
BY
Hobbs & Green
ATTORNEYS

SHAFT COUPLING

This application is a continuation-in-part of my copending application Ser. No. 40,751 filed May 27, 1970, now abandoned.

The conventional flexible shaft coupling includes a torsional element of a generally arcuate cross sectional shape having inwardly extending side walls which are clamped to opposed shaft flanges by clamping rings secured to the flanges by screws or bolts. The torsional element is usually made of reinforced elastomeric material and may be provided with a slit to permit easy installation without disturbing the flanges on the ends of the two aligned shafts. The normally relatively large and circumferentially protruding nature of the prior elements generates appreciable axial and radial thrust at relatively high speeds, such that their performance and endurance are not satisfactory under high speed conditions. Further, an imbalance of forces in the matrix during high speed operation causes the forces of the large elements to concentrate in the area along the clamping rings and hence often results in premature failure of the element. It is therefore one of the principal objects of the present invention to provide a shaft coupling having a flexible torsional element, in which the axial and radial forces generated by centrifugal forces at relatively high speeds are minimized, contained, and distributed as stresses in the torsional element matrix, and in which constant stress characteristics are obtained from the relatively simple design and structure which permit the wall thickness of the element to be specifically designed and constructed to obtain optimum operational performance for any given element.

Another object of the invention is to provide a shaft coupling having a torsional element which is capable of handling axial, parallel and angular shaft misalignments, either singly or in combination with low reaction forces, while effectively transmitting the torsional forces from one shaft to the other.

Still another object of the invention is to provide a coupling adapted to connect two generally aligned shafts, employing a torsional element of elastomeric material in which the element may be either of a split construction or of a circumferentially continuous structure, of such design as to permit higher peripheral operating speeds, and which utilizes a radially oriented clamping pressure for securing the element to the flanges, thereby utilizing the frictional forces resulting from the radial pressure to retain the element in the coupling assembly and to transmit effectively the torsional forces through the coupling structure from the driving to the driven shaft.

A further object is to provide a relatively simple and reliable shaft coupling embodying a torsional element, which can readily be assembled and installed and thereafter easily serviced, and which is so designed and constructed that it can efficiently be manufactured and used for a variety of different applications and types of installations.

Additional objects and advantages of the invention will become apparent from the following description and accompanying drawings, wherein.

Figure 1:
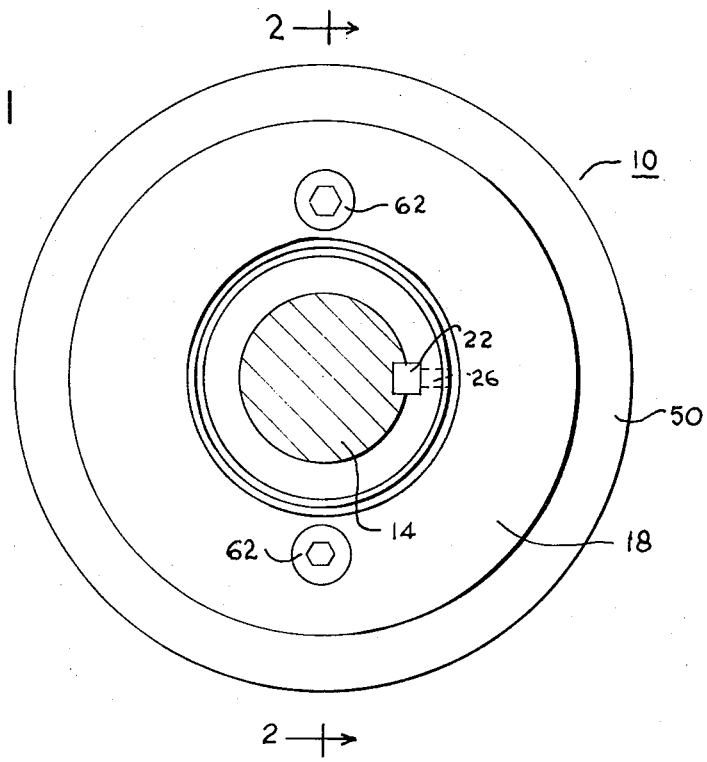
FIG. 1 is a side elevational view of the present shaft coupling, illustrating it mounted on a shaft shown in cross section.
Figure 2:
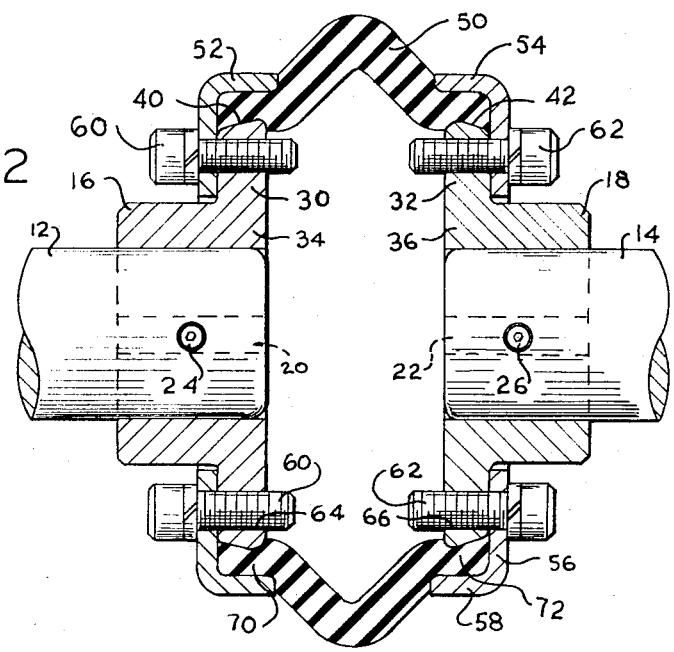
FIG. 2 is a vertical cross sectional view of the shaft coupling shown in FIG. 1, the section being taken on line 2 — 2 of the latter figure, the shafts on which the coupling is mounted being shown in elevation.

Referring more specifically to the drawings, and to the embodiment illustrated in FIGS. 1 and 2, numeral 10 indicates generally the present shaft coupling and numerals 12 and 14 the two shafts connected by the coupling, one of the two shafts, for example shaft 12, being the driving shaft and shaft 14 the driven shaft. The two shafts may be of different sizes than those shown, and one shaft may be of a different diameter from the other shaft. While the two shafts are ideally in precise alignment, in many installations the two shafts can be of axial, parallel, or angular misalignment or of a combination of these misaligned relationships. The present coupling is adapted to transmit effectively the torque from shaft 12 to shaft 14 with no significant reaction forces resulting from misalignments. The driving shaft may be from an electric motor or other source of power, and shaft 14 may be to any type of driven equipment.

The present coupling consists of flanges 16 and 18 mounted on shafts 12 and 14, respectively, and secured thereto by keys 20 and 22 and set screws 24 and 26. Other types of means may be used to secure the flanges rigidly to the respective shafts. The two flanges have radially extending flange portions 30 and 32 joined integrally to cylindrical portions or hubs 34 and 36, respectively. The peripheries 40 and 42 of the two radial portions are tapered with an increasing diameter toward the center of the coupling.

A resilient torsional coupling element 50 interconnects the two flanges and seats on peripheral surfaces 40 and 42, and is clamped into firm engagement with the peripheral surfaces by clamping rings 52 and 54. Each of the two clamping rings has a radial portion 56 and an axial portion 58, the radial portion being secured to flange portions 30 and 32 by a plurality of screws 60 and 62 which are threadedly received into holes 64 and 66 in the flange portions. The torsional element has laterally extending annular margins 70 and 72 which extend into the space between the inner surface of axial portions 58 of the two rings 52 and 54 and are clamped onto the tapered surfaces 40 and 42. As screws 60 and 62 are tightened, clamping rings 52 and 54 are drawn inwardly, i.e., toward one another, compressing margins 70 and 72 on surfaces 40 and 42 with sufficient force to form an effective gripping action between the margins and the restraining surfaces, particularly the tapered surfaces 40 and 42, so that pressure is applied to the margins substantially uniformly through the entire circumferential area.

The torsional element of the embodiment illustrated in FIGS. 1 and 2 is circumferentially continuous, i.e., not interrupted by a slit. In view of the relatively small diameter of the element, the forces created by the centrifugal action resulting from rotation of the coupling are minimized, and any imbalancing forces created by misalignment of the two shafts 12 and 14 are distributed uniformly throughout the coupling rather than being concentrated at any particular point, or along the marginal portions clamped within clamping rings 52 and 54. The torsional element is preferably constructed of rubber or other suitable elastomeric material and may be reinforced by any suitable material such as layers of fabric extending throughout the circumference of the element.

In the use and operation of the shaft coupling, with the coupling first disassembled, the two flanges are mounted on the respective shafts and secured thereto by keys 20 and 22 and set screws 24 and 26, respectively. After the flanges have been secured to the shafts, the torsional element 50 is secured in place by compressing margins 70 and 72 within the space between the inner surface of rings 52 and 54 and the inwardly tapered surfaces 40 and 42 as screws 60 and 62 are tightened. The two rings 52 and 54 are drawn axially by the screws, pressing the margins of the element axially inwardly, thereby seating the element firmly on tapered surfaces 40 and 42 and clamping the margins of the element uniformly throughout their circumferences.

Figure 3:
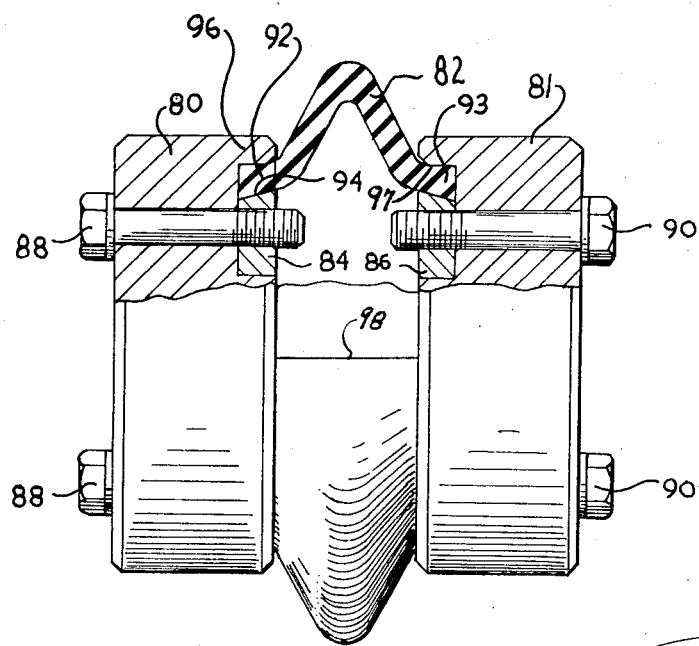
FIG. 3 is an elevational view of a shaft coupling illustrating a modified form.
Figure 4:
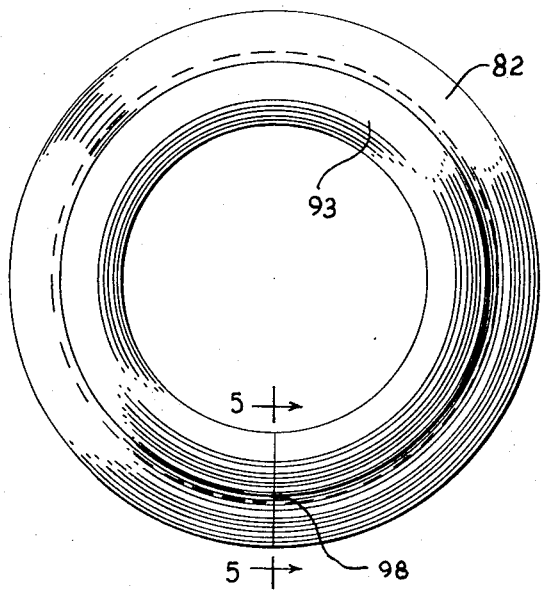
FIG. 4 is a side elevational view of the torsional element of the embodiment shown in FIG. 3.
Figure 5:
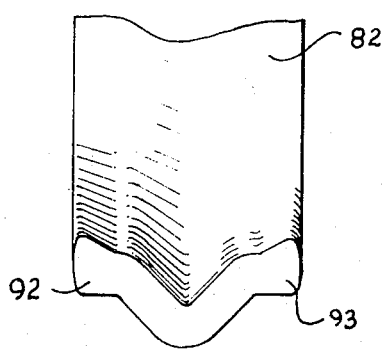
FIG. 5 is an enlarged, fragmentary cross sectional view of the torsional element shown in FIG. 4, the section being taken on line 5 — 5 of the latter figure.

In the embodiment illustrated in FIGS. 3, 4 and 5, a pair of flanges indicated by numerals 80 and 81 are secured to the ends of the two shafts to be connected by the coupling, and element 82 of the same general circumferential and cross sectional configuration as that shown in FIGS. 1 and 2 is clamped to flanges 80 and 81 by internal clamping rings 84 and 86. The two clamping rings are secured to the inner side of flanges 80 and 81 by a plurality of bolts 88 and 90, respectively, extending through the flanges and being threadedly received in threaded holes in clamping rings 84 and 86. The margins 92 and 93 of the flexible element are clamped on the tapered peripheral surface 94 of each of the two clamping rings by the overlapping, axially extending portion 96 of flanges 80 and 81. In this embodiment the tapered clamping surface is on the periphery of the clamping rings instead of on the flanges, and peripheral surface 97 on the inner side of portion 96 engages the flange margins in opposed relationship to the tapered surface 94.

While the coupling flanges and clamping rings are somewhat different in design, they are substantially the same as the previously described embodiment with respect to clamping the element in operating position in the coupling. FIG. 4 illustrates the element removed from the coupling, and the element is shown having a slit 98 which extends completely through the body from side to side and from inside to outside. The element can be sprung open at the slit so that the normally adjacent ends of the element at the slit will slide over the flanges transverse to the axis, thus permitting the element to be placed on the flanges with a minimum amount of effort and without removing or loosening the flanges from the shaft. After the element has been placed over the flanges of the embodiment shown in FIGS. 1 and 2 or over the clamping rings of the embodiment of FIGS. 3, 4 and 5, it assumes essentially its complete circular shape, and can be readily and effectively clamped into place by the clamping rings and the cooperating surfaces of the flanges. The cross sectional shape of the element when not clamped in the coupling is illustrated in FIG. 5. When the element is assembled in the coupling in either embodiment, flanges 92 and 93 on the two sides are compressed from the shape illustrated in FIG. 5 to the shape illustrated in FIG. 3, and the forces generated by the operation of the coupling, resulting from both the rotation of the coupling and misalignment of the shafts, are distributed substantially uniformly throughout the coupling circumference. Except for the slit 98, the element 82 has substantially the same configuration and operational characteristics as the one described previously herein. An element of the foregoing general configuration but having two or more slits similar to slit 98, may be used in order to reduce the stiffness of the element.

The general configuration and clamping arrangement of the torsional element, including the generally V-shaped cross section, the relatively small diameter, and the uniform peripheral clamping action at margins 70 and 72, permit higher peripheral operating speeds and distribution of forces created by the centrifugal forces, as well as those created by various misalignments of the shafts. This results in optimum performance over an extended period of time, as well as avoiding excess stress conditions in concentrated areas which may result in premature failure of the torsional element. The torsional element mounted on and secured to the two flange portions 30 and 32 results in a structure capable of handling shafts in axial, parallel and angular misalignment, or any combination thereof, with low reaction forces, while effectively transmitting the torque from one shaft to the other.

While only two embodiments of the present shaft coupling have been described in detail herein, various other changes and modifications may be made without departing from the scope of the invention.

I claim:

1. A shaft coupling comprising two spaced annular members, each having an axial bore and an annular peripheral surface tapered with an increasing diameter toward the inner side thereof, a torsional element composed of elastomeric material forming a circular structure and having an annular protruding center portion and laterally extending annular margins for seating on said tapered surfaces, a ring-shaped member for each annular member having laterally extending annular portions clamping said margins onto said tapered surfaces, and means for moving the respective annular member and ring-shaped member axially together to seat and retain said margins on said tapered surfaces.

2. A shaft coupling comprising two spaced flanges, each having an axial bore for receiving a shaft and an annular peripheral surface tapered with an increasing diameter toward the inner side of the flange, a torsional element composed of elastomeric material forming a circular structure and having an annular protruding center portion and laterally extending annular margins for seating on said tapered surfaces, rings having laterally extending annular portions clamping said margins onto said tapered surfaces, and means for moving said rings axially to seat said rings on said flanges and said margins on said tapered surfaces.

3. A shaft coupling as defined in claim 2 in which said torsional element is of a continuous circular structure.

4. A shaft coupling as defined in claim 1 in which said torsional element is of a circular structure with a slit extending radially and axially through the structure to permit the structure to be opened when the element is assembled and disassembled on said flanges.

5. A shaft coupling as defined in claim 4 in which said protruding center portion of said torsional element is of a generally V-shaped configuration and said annular margins extend substantially in the axial direction on opposite sides thereof.

6. A shaft coupling as defined in claim 2 in which said rings are substantially L-shaped in cross sectional configuration and laterally extending annular portions engage the external surface of said margins.

7. A shaft coupling as defined in claim 2 in which said rings have a radially extending portion seating on the respective flanges.

8. A shaft coupling as defined in claim 1 in which said means for moving said rings axially consists of a plurality of screws extending through said radially extending portions.

9. A shaft coupling as defined in claim 2 in which a plurality of screws extend through said rings and are threadedly received in holes in said flanges.

10. A shaft coupling as defined in claim 9 in which said rings have a radially extending portion and said screws engage said radial portion to seat said radial portion on the respective flange.

11. A shaft coupling as defined in claim 10 in which said flanges have a radially extending portion with an outer radially extending portion with an outer radially extending surface upon which said radially extending portions of said rings seat as said screws are tightened in the threaded holes of said flanges.

12. A shaft coupling as defined in claim 11 in which said tapered surfaces are on the peripheries of said radially extending portions of the flanges.

13. A shaft coupling as defined in claim 2 in which said laterally extending annular margins on said element are joined integrally and directly with the edges of said V-shaped configuration and said tapered surfaces and rings embrace substantially all of said margins.

14. A torsional element for a shaft coupling, comprising a circular structure composed of elastomeric material and having an annular protruding center portion of a generally V-shaped configuration, and margins extending laterally substantially parallel with the center axis of the element and being thicker near the outer edge than near the V-shaped portion.

* * * * *